United States Patent [19]

Peters, Jr.

[11] Patent Number: 5,201,829

[45] Date of Patent: Apr. 13, 1993

[54] FLIGHT CONTROL DEVICE TO PROVIDE DIRECTIONAL CONTROL

[75] Inventor: Spence E. Peters, Jr., Fort Worth, Tex.

[73] Assignee: General Dynamics Corporation, Fort Worth, Tex.

[21] Appl. No.: 810,700

[22] Filed: Dec. 19, 1991

[51] Int. Cl.$^5$ .............................................. B64C 5/00
[52] U.S. Cl. ................................ 244/75 R; 244/199; 244/3.21
[58] Field of Search .................. 244/76 A, 184, 87, 88, 244/75 R, 213, 214, 197, 45 A, 3.21, 3.22, 3.28

[56] References Cited

U.S. PATENT DOCUMENTS

| | | | |
|---|---|---|---|
| 3,152,775 | 10/1964 | Boyd | 244/45 |
| 3,995,794 | 12/1976 | Lanier | 244/12 A |
| 4,194,708 | 3/1980 | Tracy et al. | 244/15 |
| 4,351,503 | 9/1982 | Drori | 244/3.24 |
| 4,699,340 | 10/1987 | Rethoret | 244/199 |
| 4,786,009 | 11/1988 | Rao | 244/75 R |
| 4,927,096 | 5/1990 | Kranz | 244/3.22 |
| 5,050,819 | 9/1991 | Moskovitz | 244/87 |
| 5,080,301 | 1/1992 | Knoche et al. | 244/3.22 |
| 5,083,724 | 1/1992 | Kranz | 244/3.21 |

OTHER PUBLICATIONS

AIAA 28th Aerospace Sciences Meeting, Nov. 8-11, 1990, Reno, Nev., 370 L'Enfant Promenade, S.W., Washington, D.C. 20024.

Primary Examiner—Joseph F. Peters, Jr.
Assistant Examiner—Christopher P. Ellis
Attorney, Agent, or Firm—James E. Bradley

[57] ABSTRACT

An airplane has a control device for providing a directional moment to control yaw during high angles of attack. The control device includes a chine support member carried at the forward end of the airplane forward of the fuselage. The chine support member rotates about a chine axis which is parallel or coaxial with the longitudinal axis of the airplane. A chine is mounted to the chine support member, the chine having a pair of substantially flat, thin, flight control surfaces rigidly mounted on opposite sides of the chine support member. These flight control surfaces rotate with the chine support member to control vortices formed on the chine during flight to provide directional moments. A drive motor will rotate the chine support member to control the angle of the chine. A control means including the aircraft computer controls the drive motor.

12 Claims, 2 Drawing Sheets

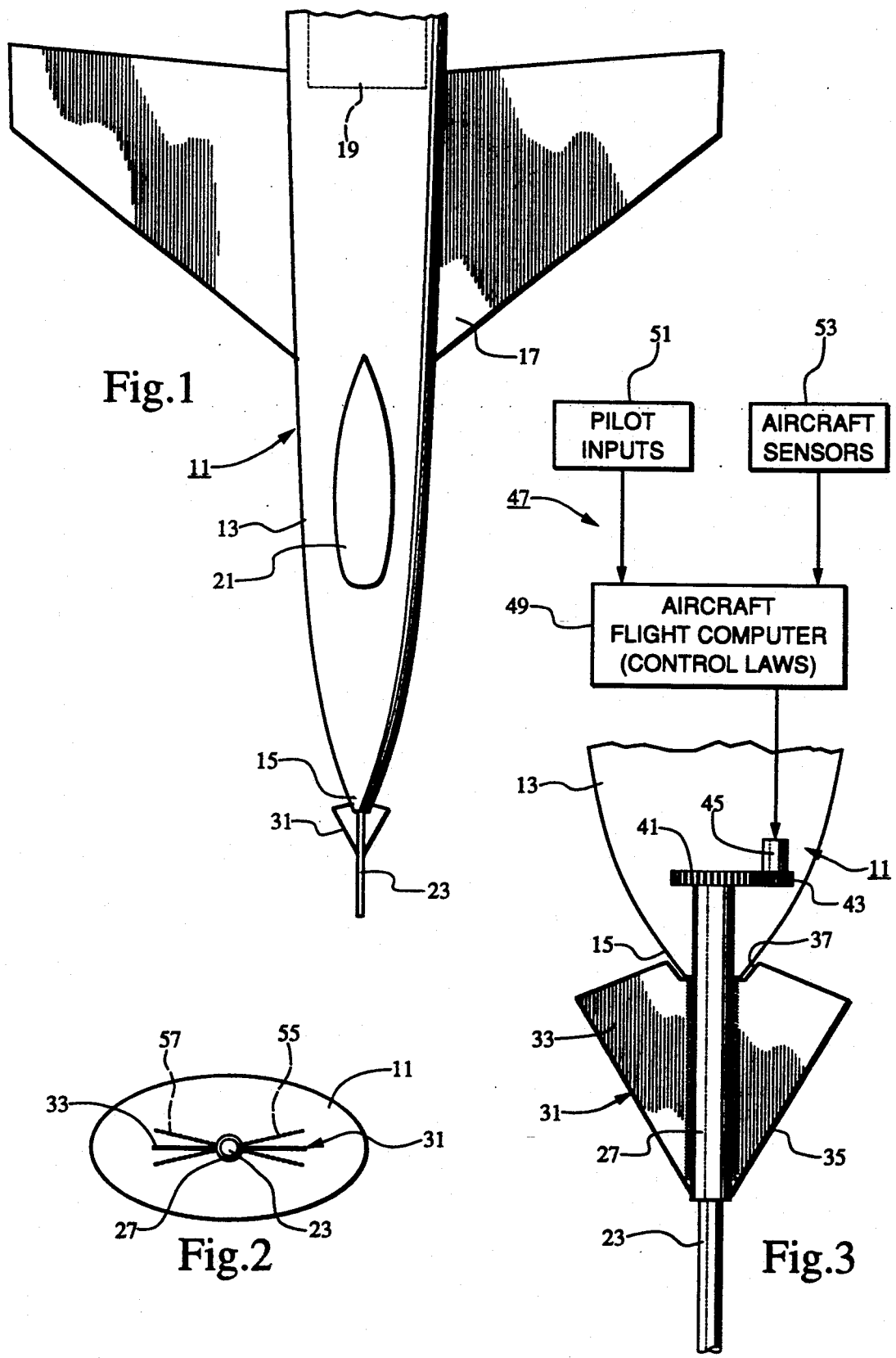

FLIGHT CONTROL DEVICE TO PROVIDE DIRECTIONAL CONTROL

BACKGROUND OF THE INVENTION

1. Field of the invention

This invention relates in general to flight control devices for airplanes, and in particular to a device to produce directional moments to control yaw of the airplane while under high angle of attack.

2. Description of the Prior Art

Highly maneuverable airplanes are traditionally required to operate in flight regions where the angle of attack, also called "incidence angle", is large. The angle of attack is approximately the angle between the longitudinal axis of the airplane and the direction of its motion. For the airplane to be able to fly safely and perform maneuvers at a high angle of attack, it must be stable and controllable.

Modern airplanes are not required to be inherently stable, but must appear to be so to the pilot. Stability is the tendency of the airplane to return to its initial state when subjected to a disturbance. To achieve apparent stability with an inherently unstable airplane requires that the flight conditions of the airplane be measured and fed back into a flight control computer. The computer then commands the flight controls to generate forces and moments that arrest unwanted airplane motions. Examples of the airplane flight conditions include its attitude with respect to the airstream, velocity, and rotational motions. If it is desired to maneuver the airplane, it must generate forces and moments to reorient itself or change its direction of motion. Both artificial stabilization and maneuvering require substantial forces and moments to be generated by the controls, particularly in the high incidence, or high angle of attack flight region.

To artificially stabilize and control the airplane, control forces and moments, particularly rotational moments, must be available about all primary axes of the aircraft. These axes are the pitch, or nose up, nose down axis; the yaw, or nose right, nose left axis; and the roll, or wing up, wing down axis. The invention described herein is concerned particularly with the yaw axis. At large aircraft incidence angles, natural motions of the aircraft about this axis tend to be unstable unless artificially controlled. Furthermore, standard maneuvers to change the flight path, or direction of motion, of the aircraft require that the aircraft be rotated about an axis that is coincident with the direction of the aircraft motion. Both of these needs dictate that the aircraft possess the capability to generate large control moments about the aircraft yaw axis.

Due to the nature of the flow about aircraft, traditional means of yaw control are ineffective in the high incidence flight region. This is due to the fact that aerodynamic controls usually operate on the principle of generating lift. Lift is a force acting generally normal to the flight path. At high aircraft incidence angles, the air flow over the surface separates from it and destroys the lifting forces. If an aerodynamic component is located at the rear of the aircraft, it is often blocked by portions of the aircraft ahead of it during flight at high angles of attack. It is then in a region of airflow that is so disturbed that it cannot effectively generate forces, even if its own incidence is relatively small.

Up until recent years, even high performance aircraft were not intentionally operated at incidence angles larger than those at which the maximum lift force was developed. The primary means of yaw directional control was the rudder, which is the hinged control surface attached to the end of the vertical tail or tails. The major problem with the rudder is that its effectiveness is greatly diminished at large aircraft incidence angles, due to the blockage of the wings and forward fuselage, and hence its immersion in a region of highly disturbed flow. Because of these problems, it is not suitable as a yaw control device at very high aircraft incidence angles.

Another means of directional control is differential deflection of wing controls or of the horizontal tails. In this case, the flaps or tail panels are deflected to different settings on opposite sides of the aircraft. While the primary intent of this method is to generate differential lift, or upward force, for rolling the aircraft about its longitudinal axis, yawing moments are also produced. This is due to the differences in drag, or longitudinal forces, on opposite sides of the aircraft as well as induced effects on the vertical tail surfaces. This differential drag produces a yawing moment on the aircraft. While this control moment will work to fairly large aircraft incidence angles, the total moments available are relatively small. In the case of differential horizontal tail deflection, use of these surfaces to generate yaw moments reduces the amount of moment available in the pitch axis, which is the primary axis of operation of the horizontal tail. Such a loss in pitch control can greatly impact the ability of the aircraft to operate at large incidence angles and can result in loss of control during maneuvering flight.

A more recent means of yaw control employs strategically placed holes or slots on the forebody of the aircraft. When control moments are required, air is injected through these holes or slots at a predetermined rate and direction. This additional air modifies the normal flow pattern over the aircraft forebody, and relatively large yawing moments can be generated, such moments being available at large aircraft incidence angles. While effective, this method of yaw control has many disadvantages. It requires that pneumatic lines be run through the forward section of the aircraft. Typically, these will have to be routed very close to the forward part of the nose. The presence of these pipes and tubes ahead of what is the normal location of the radar transmitting antenna can dramatically reduce the performance of any radar system carried. Such a pneumatic control system also requires a source of relatively high pressure air. This air must be taken from the engine or stored in tanks. High pressure air taken from the engine will reduce its overall performance and the thrust available to propel the aircraft. Finding a position for storage tanks of adequate size may be difficult, and such tanks will add weight to the aircraft, which will also tend to reduce its overall performance.

Another method developed recently to generate moments for yaw control also makes use of forces generated on the forebody of the aircraft. It is also most effective for large aircraft incidence angles. It consists of large movable flaplike devices or panels mounted on the nose of the aircraft. Under conditions when no control moments are required, these panels are retracted so as to match the normal contours of the forebody. When a control moment is required, one of these large panels is moved away from the forebody on only one side of the aircraft. The deflection of this panel alters the flow field on the forebody of the aircraft and causes a directional moment to be generated. The strength and direction of this moment is dependent on the location of the panel, its deflection, and the attitude of the aircraft with respect to the direction of its motion.

While this method of directional control may be effective, it also has many disadvantages. The panels are large, on the order of several feet in length and close to a foot in width. This large size impacts high performance aircraft in several ways. First, the required size and location reduces the volume available in the nose of the aircraft for a radar system. The blockage caused by these panels and their associated hardware can be assumed to reduce the performance of the radar system that is fitted in this area. Since the size of the equipment needed to move the panels is related to the size of the panels themselves, these actuation devices may be large and heavy. Since only one of the control panels is moved at any one time, it may be necessary to have two actuation devices. In summary, while this means of directional control for high incidence may be effective, it is heavy, bulky, and requires a complex actuation system. All of these would tend to reduce the overall performance of the aircraft.

SUMMARY OF THE INVENTION

In this invention a chine, or flight control surface, is mounted on the nose of the aircraft so that it is in a region of relatively undisturbed air during flight at large aircraft incidence angles. The chine consists of two small, relatively thin, flat aerodynamic surfaces attached to a chine support. The chine support is in one embodiment a central sleeve rotatably mounted around the pitot probe of the aircraft. The chine support can be rotated about the longitudinal axis of the aircraft. An actuator, preferably an electric or hydraulic motor, will rotate the chine to various positions.

A control means, consisting of the aircraft computer and sensors, will provide signals to the drive motor to rotate the chine to the various angles. When rotated to a position other than a neutral position, directional control moments are generated to control yaw.

BRIEF DESCRIPTION OF THE DRAWINGS

FIG. 1 is a top schematic view of an airplane having a control device constructed in accordance with this invention.

FIG. 2 is a front view of the aircraft of FIG. 1, illustrating the control device rotated to two different positions shown by dotted lines.

FIG. 3 is a schematic partial top view illustrating portions of the flight control device of FIG. 1.

DETAILED DESCRIPTION OF THE INVENTION

Figure 4:
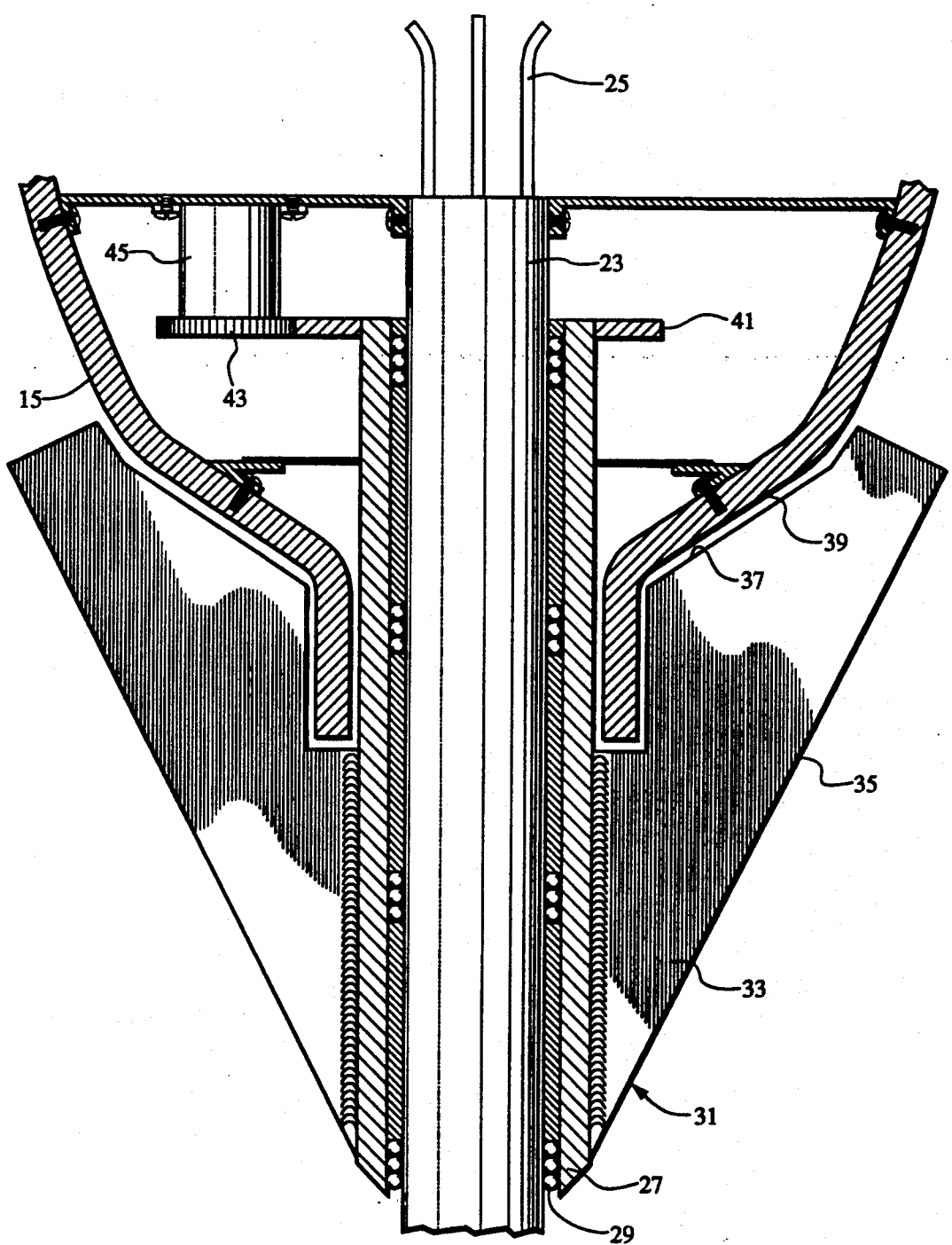
FIG. 4 is a larger sectional view of the flight control device of FIG. 1, schematically illustrating more details.

Referring to FIG. 1, airplane 11 will normally be a military jet airplane. It has a fuselage 13 with a longitudinal axis. A nose 15 locates at the forward end of airplane 11. Wings 17 extend outward from fuselage 13 on opposite sides of the longitudinal axis. Wings 17 provide lift for airplane 11. There will also be a tail and various flaps, rudders and other flight control devices not illustrated. A jet engine 19 supplies power for airplane 11. A pilot will control airplane 11 from a cockpit 21.

In the embodiment shown, a pitot probe 23 extends forward from the nose 15. Pitot probe 23 is a hollow shaft. Pneumatic lines 25 (FIG. 4) extend through pitot probe 23 to provide information concerning flight conditions of the aircraft, such as air temperature and aircraft speed.

Referring to FIG. 3 and FIG. 4, a chine support 27 mounts rotatably to pitot probe 23. Chine support 27 in the embodiment shown is a cylindrical sleeve separated from the exterior of pitot probe 23 by bearings 29. Chine support 27 will rotate about a chine axis, which is coaxial with the axis of pitot probe 23. This axis is parallel and normally coaxial with the longitudinal axis of airplane 11.

A chine 31 is rigidly mounted to chine support 27 for rotation therewith. In the drawings chine 31 is not to scale and may actually be much smaller than shown. Chine 31 comprises two flight control surfaces 33, mounted on opposite sides of chine support 27. In the embodiment shown, the flight control surfaces 33 are located in the same plane and are thus spaced 180 degrees apart from each other on chine support 27. A plane passing through the flight control surfaces 33 also passes through the chine axis. In other applications, the flight control surfaces 33 may be located at angles relative to each other, rather than in the same plane.

Each flight control surfaces 33 is a relatively thin, flat sheet. The thickness is preferable 0.03 to one-inch. Each flight control surface 33 has an aerodynamic or surface area which is much smaller than the aerodynamic or surface area of the wings 17. Preferably, the total surface area of both flight control surfaces 33 is about 0.05 to 0.5 percent of the total aerodynamic surface area of the wings 17. The flight control surfaces 33 are not configured to product any significant lift in comparison to the lift generated by wing 17.

Each flight control surface 33 has a sharp leading edge 35 for purposely creating vortices, as will be subsequently explained. The leading edges 35 sweep back at an angle greater than 45 degrees relative to the axis of pitot probe 23. The leading edges 35 thus diverge from each other, resulting in a generally delta shape to chine 31. Each flight control surface 33 has a trailing edge 37. The trailing edge 37 is contoured to match the leading edge contour 39 of nose 15. In the embodiment shown, the leading edge contour 39 is curved and conical. A small gap exists between the trailing edges 37 and the leading edge contour 39. An outer portion of the trailing edge 37 of each flight control surface 33 extends rearward of the tip of and alongside the leading edge contour 39.

A drive means is employed for rotating chine support 27 about the axis of chine support 27. This drive means includes a driven gear 41 which mounts rigidly to the rearward end of chine support 27. A drive gear 43 has teeth that engage the teeth of the driven gear 41. Drive motor 45 rotates driven gear 43. Drive motor 45 may be electrically or hydraulically actuated.

Referring to FIG. 3, a control system 47 will control drive motor 45. Control system 47 will selectively actuate drive motor 45 to position chine 31 for a desired directional moment needed during high incidence angle flight. Control system 47 includes the existing conventional computer 49 of the aircraft 11. The computer 49 receives a pilot input 51. Aircraft sensors 53, which sense various flight conditions of the aircraft, also connect to flight computer 49 in a conventional manner. Aircraft sensors 53 conventionally measure angle of attack, velocity, rotational rates and acceleration. Software contained in the aircraft computer 49 will be utilized to provide the correct amount of control to drive motor 45 to position the chine 31.

In operation, the chine 31 will have a neutral position which is illustrated by the solid line in FIG. 2. In the neutral position, the flight control surfaces 33 are both at the same angle or orientation relative to the wings 17. In the embodiment shown, the flight control surfaces 33 are substantially parallel with the wings 17 while in the neutral position. If during high incidence flight, a directional moment is needed to control yaw in response to aircraft sensors 53 or pilot command 51, the flight computer 49 will signal the drive motor 45 to rotate the chine 31 to a selected position other than the neutral position. A directional moment could be needed generally when the conventional directional flight control surfaces begin II to lose effectiveness. The dotted lines 55 of FIG. 2 show chine 31 rotated in one direction. The dotted lines 57 show chine 31 rotated in the other direction. The amount of rotation is in all cases less than 90 degrees, and normally less than 60 degrees, in one direction or the other from the neutral position shown in FIG. 2. The control system 47 thus prevents the drive motor 45 from rotating the chine 31 more than 180 degrees.

The principle of operation of the chine 31 is not completely understood in every detail, and such details will tend to vary depending upon the installation and on the aircraft 11 on which it is carried. However, the principle of operation is based on the generation and modification of vortex flow on the forebody of the aircraft Vortices, which are relatively small, intense regions of rotating flow, are known to form over geometric shapes typical of aircraft forebodies under conditions when there is a large incidence between the wind and the longitudinal axis of the fuselage 13. Vortices are also formed along surfaces with relatively sharp edges, such as the leading edges 35 of the flight control surfaces 33. Such relatively sharp leading edges 35 are used on the chine 31 to deliberately create vortices separate from those which form on the forebody of the fuselage 13. The general physical effect of these vortices is to reduce the local air pressure in their vicinity. If, due to the nearby presence of a vortex, air pressure is reduced on one side of a body in flight while the other side remains unaffected, a force will be generated on the object acting in the direction of the vortex.

When the aircraft is operating at large incidence angles, and the chine 31 is in the neutral position, vortices are formed along the forebody of fuselage 13 and along each side of the chine flight control surfaces 33. These vortices are generally symmetric. They are the same on both sides of the aircraft nose 15. Under these conditions, no net sideways force is produced on the aircraft 11.

If the computer 49 instructs the drive motor 45 to reposition the chine 31, the location of the vortices generated along its leading edges 35 changes. Their interactions with the vortices formed by flow along the forebody of fuselage 13 are also changed. As the location of these vortices in the flowfield is altered, their proximity and relative position with respect to the aircraft 11 is also altered. This asymmetry produces a net sideways force on the forebody of the aircraft fuselage 13, which is in turn reflected as a rotational moment about the aircraft directional axis. The exact magnitude of the forces and moments are strongly dependent on the aircraft attitude and the exact geometry of both the aircraft fuselage 13 forebody and the chine 33.

The invention has significant advantages. The control device effectively generates yawing moments during flight conditions where traditional aerodynamic controls are ineffective due to separation of the airstream from the control surfaces. The yawing moments generated by the control device can be used to stabilize the aircraft or assist in performing any necessary maneuvers.

While the invention has been shown in only one of its forms, it should be apparent to those skilled in the art that it is not so limited, but is susceptible to various changes without departing from the scope of the invention. For example, if the airplane does not utilize a pitot probe, a shaft could be mounted to the nose of the airplane to rotatably carry the chine support.

I claim:

1. In an airplane having a fuselage which has a forebody terminating in a fuselage nose, the forebody creating forebody vortices during high angle of attack flight, the airplane having a pair of wings extending from opposite sides of the fuselage to provide lift, an improved apparatus for controlling yaw of the airplane during high angles of attack, comprising in combination:

a chine support member carried forward of the nose of the airplane, the chine support member having a chine axis which extends along the length of the airplane, the chine support member being rotatable relative to the nose about the chine axis;

a chine mounted to the chine support member, the chine comprising a pair of substantially thin flight control surfaces mounted on opposite sides of the chine support member forward of the nose and configured for creating chine vortices independent of the forebody vortices;

a drive motor in engagement with the chine support member for rotating the chine support member and the chine about the chine axis; and control means for controlling the drive motor to position the chine at selected vortices to interact with and move the forebody vortices to generate directional control moments to control yaw.

2. The airplane according to claim 1 wherein the flight control surfaces of the chine have a total aerodynamic surface area that is substantially less than the total aerodynamic surface area of the wings.

3. The airplane according to claim 1 wherein the flight control surfaces of the chine have a total aerodynamic surface area that is in the range of 0.05 to 0.5 percent of the aerodynamic surface area of the wings.

4. The airplane according to claim 1 wherein the chine has a neutral portion relative to the wings wherein each of the flight control surfaces is at the same orientation relative to the wings, and wherein the control means controls the drive motor to rotate the chine support no more than 90 degrees in any direction from the neutral position.

5. The airplane according to claim 1 wherein the chine has a neutral position relative to the wings wherein each of the flight control surfaces is at the same angular position relative to the wings, and wherein the control means prevents the drive motor from rotating the chine support and the flight control surfaces more than 60 degrees in any direction from the neutral position.

6. The airplane according to claim 1 wherein:

the airplane has a leading edge contour on its nose as seen in a cross-sectional view taken along a plane that passes through a longitudinal axis of the airplane and is substantially parallel to a plane of the wings; and the flight control surfaces of the chine have leading edges and trailing edges and a substantially constant cross-sectional thickness from the leading edge to the trailing edge, the trailing edges having a recessed central portion with a contour that matches the leading edge contour of the nose of the airplane, the central portion of the trailing edges being spaced closely to the leading edge contour of the nose of the airplane.

7. The airplane according to claim 1 wherein:

the airplane has a leading edge contour on its nose as seen in a cross-sectional view taken along a plane that passes through a longitudinal axis of the airplane and is substantially parallel to a plane of the wings; and wherein the flight control surfaces of the chine have leading edges and trailing edges, the leading edges sweeping back and diverging, the trailing edges having a recessed central portion with a contour that matches the leading edge contour of the nose of the airplane, the central portion of the trailing edges being spaced closely to the leading edge contour of the nose of the airplane.

8. In an airplane having a fuselage which has a longitudinal axis, a fuselage nose having a leading edge contour, the airplane having means including a pair of wings extending from opposite sides of the fuselage for producing lift, an improved apparatus for controlling yaw of the airplane during high angles of attack, comprising in combination;

a chine support member carried forward of the nose, the chine support member having a chine axis which is substantially parallel to the longitudinal axis of the airplane, the chine support member being rotatable relative to the nose about the chine axis;

a chine mounted to the chine support member forward of the nose, and configured for creating chine vortices independent of the forebody vortices, the chine comprising a pair of flight control surfaces rigidly mounted on opposite sides of the chine support member for rotation with the chine support member, the flight control surfaces having a neutral position in which each flight control surface lies at the same angle relative to a plane of the wings;

the chine having leading edges which sweep back and diverge, terminating at trailing edges, the flight control surfaces being thin, substantially flat sheets substantially constant in cross-sectional thickness from the leading edges to the trailing edges;

the flight control surfaces of the chine having a total aerodynamic surface area that is substantially less than the total aerodynamic surface area of the wings;

drive motor means in engagement with the chine support member for rotating the chine support member and the chine about the chine axis; and control means for controlling the drive motor means to change the angle of the flight control surfaces relative to the wings from the neutral position to positions less than 90 degrees from the neutral position in any direction to cause the chine vortices to interact with and move the forebody vortices to generate directional control moments to control yaw.

9. The airplane according to claim 8 wherein the total aerodynamic surface area of the flight control surfaces of the chine is in the range of 0.05 to 0.5 percent of the total aerodynamic surface area of the wings.

10. The airplane according to claim 8 wherein the control means prevents the drive motor means from rotating the chine support and the flight control surfaces more than 60 degrees from the neutral position in any direction.

11. The airplane according to claim 8 wherein the airplane has a leading edge contour on its nose as seen in a cross-sectional view taken along a plane that passes through the longitudinal axis of the airplane and is substantially parallel to a plane of the wings; and wherein the trailing edges of the flight control surfaces of the chine have portions which extend alongside a portion of the leading edge contour of the nose.

12. A method for controlling yaw of an airplane during high angles of attack, the airplane having a fuselage which has a forebody terminating in a fuselage nose and a longitudinal axis, the forebody creating forebody vortices during high angle of attack flight, the airplane having a pair of wings extending from opposite sides of the fuselage to provide lift, the method comprising:

mounting a chine to the airplane forward of the nose on a chine axis which is substantially parallel to the longitudinal axis, and providing the chine with a pair of flight control surfaces extending on opposite sides of the chine axis and configured for creating chine vortices independent of the forebody vortices; and selectively rotating the chine about the chine axis relative to the nose to position the chine at selected angles relative to the wings to cause the chine vortices to interact with the forebody vortices to move and forebody vortices to generate directional control moments to control yaw.

* * * * *